United States Patent [19]
Biros, Jr. et al.

[11] Patent Number: 5,928,106
[45] Date of Patent: Jul. 27, 1999

[54] ELECTRO-HYDRAULIC CLUTCH ACTUATION SYSTEM FOR MANUAL TRANSMISSION

[75] Inventors: Thomas A. Biros, Jr., West Chicago, Ill.; Robert A. Weber, Ft. Wayne, Ind.

[73] Assignee: Navistar International Transportation Corp, Chicago, Ill.

[21] Appl. No.: 08/951,992

[22] Filed: Oct. 16, 1997

[51] Int. Cl.$^6$ .......................... B60K 41/28; B60K 41/02
[52] U.S. Cl. .......................... 477/81; 192/3.58; 192/3.62
[58] Field of Search ..................... 192/3.62, 3.58, 192/83; 477/80, 81

[56] References Cited

U.S. PATENT DOCUMENTS

| | | | |
|---|---|---|---|
| 3,752,282 | 8/1973 | Espenshied | 192/91 R |
| 4,131,184 | 12/1978 | Rumyantsev et al. | 192/3.58 X |
| 4,505,364 | 3/1985 | Goucher . | |
| 4,625,840 | 12/1986 | Kojima et al. | 192/3.58 |
| 5,002,166 | 3/1991 | Leigh-Monstevens et al. | 192/83 X |
| 5,017,916 | 5/1991 | Londt . | |
| 5,022,509 | 6/1991 | Schweiger | 477/81 |
| 5,029,678 | 7/1991 | Koshizawa | 477/80 X |
| 5,094,079 | 3/1992 | Leigh-Monstevens et al. | 192/83 X |
| 5,135,091 | 8/1992 | Albers et al. | 192/83 X |
| 5,392,749 | 2/1995 | Stockner . | |
| 5,469,946 | 11/1995 | Nguyen . | |
| 5,507,373 | 4/1996 | Nguyen . | |
| 5,582,558 | 12/1996 | Palmeri . | |

*Primary Examiner*—Rodney H. Bonck
*Attorney, Agent, or Firm*—Jeffrey P. Calfa; Dennis Kelly Sullivan

[57] ABSTRACT

An electro-hydraulic clutch actuation system for a manual transmission comprises a slave cylinder engaged to a transmission clutch fork member, the cylinder being operated to cause clutch disengagement by actuation of a push-button on a gear shift lever of the transmission, such cylinder effectively producing a manual transmission which does not require clutch pedal actuation during shifting of the transmission. Further, the system eliminates the need for transmission synchronizers by using sensed speed of tailshaft rotation to determine the point of synchronization for such shifting, and, in an automatic mode of operation, the system indicates to an operator not only that the synchronization point has been achieved, but also prompts an upshift or downshift, as required, to minimize load. The cylinder is operated using oil under high pressure which is supplied thereto from a high pressure engine oil rail.

14 Claims, 1 Drawing Sheet

ELECTRO-HYDRAULIC CLUTCH ACTUATION SYSTEM FOR MANUAL TRANSMISSION

BACKGROUND OF THE INVENTION

The present invention relates to an electro-hydraulic clutch actuation system for a manual transmission, eliminating the need for clutch pedal actuation during shifting. More particularly, the system is proposed for use with a transmission of a vehicle having an engine incorporating a high pressure oil rail, the high pressure oil being used to operate the clutch actuation system, with synchronization points for required upshift or downshift being indicated by electronic prompts to the vehicle operator.

THE PRIOR ART

Heretofore, clutch pedal actuation during transmission upshift or downshift has been required, as has the provision of transmission synchronizers.

Clutch pedal actuation has also required more than a nominal amount of force to be applied to disengage the clutch. This was especially true for heavy duty vehicles, where the force required to disengage the clutch limited the use of these vehicles by drivers with lessor leg strength. Additionally, the points of shift synchronization have typically not been indicated to an operator, the operator necessarily having to judge from experience when and what action is to be taken to decrease transmission strain.

SUMMARY OF THE INVENTION

Accordingly, it is a primary object of the invention to provide a simple action-indicating electro-hydraulic clutch actuation system for use in environments where a high pressure source of hydraulic fluid is available.

It is a further object to provide a clutch system where clutch pedal actuation is not required. The high pressure oil source can be used for disengagement of the clutch on heavy duty vehicles such as medium and heavy duty trucks where more than a nominal amount of force is required. Low pressure engine oil lubrication systems are not adequate force wise for disengaging a clutch in a heavy duty vehicle under various conditions.

It is a further object to provide a clutch system which can be overridden leaving a clutch pedal for conventional shifting, when desired to do so.

It is yet a further object to provide a clutch system which eliminates guess work by the vehicle operator in shifting a manual transmission.

These as well as other objects of the invention are met by the clutch system of the present invention wherein a valve controlled hydraulic actuator is engaged to the transmission clutch of a vehicle, the actuator being operable through a push-button in response to prompts indicating required upshifting or downshifting, the shifting being accomplished without use of a clutch pedal of the transmission.

BRIEF DESCRIPTION OF THE DRAWINGS

Other objects and advantages of the invention will become more apparent upon perusal of the detailed description thereof and upon inspection of the drawings in which:

The FIGURE is a schematic block diagram of the electro-hydraulic clutch actuation system made in accordance with the teachings of the present invention.

DESCRIPTION OF THE PREFERRED EMBODIMENT

Figure 1:
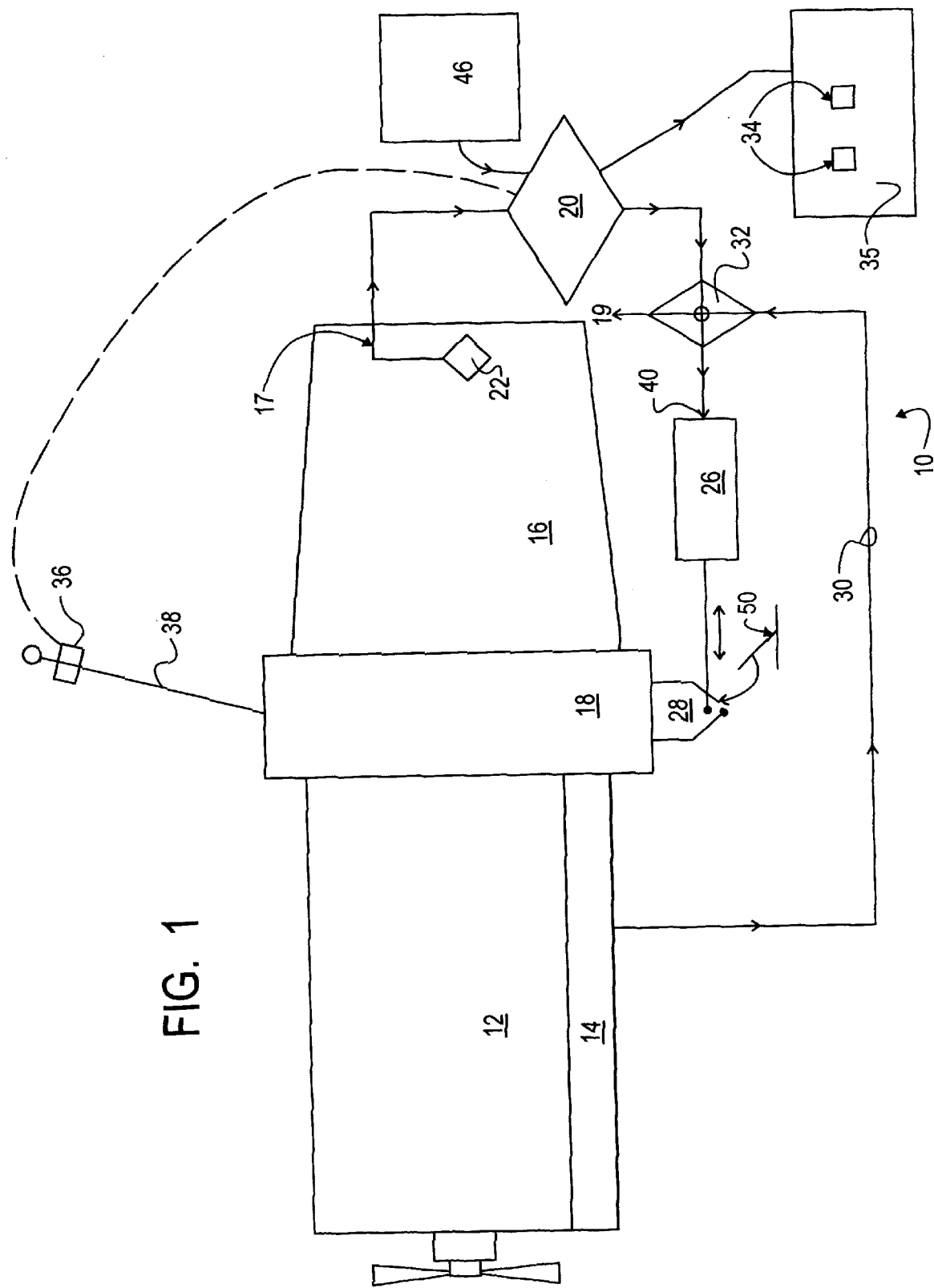

Referring now to the drawing in greater detail, there is illustrated therein a schematic representation of an electro-hydraulic clutch actuation system made in accordance with the teachings of the present invention and generally identified by the reference numeral 10.

As shown, the clutch system 10 is provided for use in a vehicle (not shown) equipped with a diesel engine 12 having a high pressure oil rail 14, and having a manual transmission 16, which typically requires actuation of a clutch pedal 50 of a standard clutch mechanism 18 during shifting thereof. The oil rail 14 is of the type described in U.S. Pat. No. 5,392,749 for a hydraulically-actuated fuel injection system and which is being incorporated by reference. One such diesel engine having such an oil rail is the International® DT-466 Engine manufactured by Navistar International Transportation Corp. For the purposes of this application, high pressure oil or fluid means oil or fluid in the range greater than or equal to 450 pounds per square inch gauge (psig); the high pressure oil being the hydraulic fluid of the invention.

The clutch system 10 also requires, in a preferred embodiment, provision of an electronic controller means 20, commonly used with modern day engines 12. The electronic controller means 20 includes a programmable electronic control means (not shown) and a means or apparatus for detecting at least a parameter and generating a parameter indicative signal, hereinafter referred to as an input signal, which is indicative of the parameter detected. The detecting and generating means preferably includes one or more conventional sensors or transducers which periodically detect one or more parameters such as engine 12 speed. Another parameter needed for this application is transmission 16 speed which is provided from a transmission tailshaft sensor 22 which is functionally engaged to the electronic controller means 20 for providing input thereto regarding sensed rotational speed of the tailshaft 17 of the manual transmission 16. The electronic controller means 20 determines the synchronization points and direction of shifting (upshift or downshift) based upon various input signals including speed of the engine 12 and sensed rotational speed of the tailshaft 17 of the manual transmission 16. The electronic controller means 20 provides output signals to a display module 35 for display of prompters 34. The prompters 34 of the display module 35 are visible to the operator of the vehicle. One prompter 34 is provided for synchronization and one prompter 34 is provided for direction of shifting (upshift or downshift). The prompters 34 and display module 35 of U.S. Pat. No. 5,017,916 are incorporated by reference.

The clutch system 10 is illustrated, in its most fundamental embodiment, to incorporate a hydraulic slave cylinder 26 which is actively engaged to a shifting fork member 28 of the clutch mechanism 18. Although the design of the slave cylinder 26 may vary, one example is a hydraulic piston (not shown) in a cylinder (not shown) arranged with the piston directly engaged to the shifting fork member 28 such that when high pressure oil is supplied to the slave cylinder 26, pressure is applied to one side of the piston causing the piston to move within the cylinder and causing the shifting fork member 28 to move towards the engine 12 and hence disengage the clutch mechanism 18. The slave cylinder 26 is fed oil under high pressure, in the range of greater than 450 psig, via an auxiliary oil line 30 from the oil rail 14 of the engine 12. A pressure control valve 32 is seated within the oil line 30 and is used under operator direction, via the electronic controller means 20, to produce desired clutch actuation in response to synchronization points indicated to the operator by dashboard mounted prompters 34. The pressure control valve 32 is a two position valve; a clutch engaged position and a clutch disengaged position. The clutch engaged position of the pressure control valve 32 is a position which fully vents the slave cylinder 26 and the oil line 30 between the slave cylinder 26 and the pressure control valve 32 to an oil sump 19 of the engine 12. The clutch dis-engaged position of the pressure control valve 32 is a position which directs high pressure oil from the oil rail 14 to the slave cylinder 26 at a pressure as directed by the electronic controller means 20. The electronic controller means 20 directing the pressure control valve 32 to port sufficient oil to produce enough force on the shifting fork member 28 of the clutch mechanism 18 to disengage the clutch mechanism 18 based upon engine 12 and manual transmission 16 operating parameters as indicated by the input data collected by the electronic controller means 20.

The slave cylinder 26 is actuated for disengagement of the clutch mechanism 18, with engagement being accomplished using pressure from a clutch spring (not shown), as is known. Such slave cylinder 26 actuation is produced by operator manipulation of a push button 36 which is provided on a shift lever 38 of the transmission 16. The push button 36 is operatively connected to the electronic controller means 20 to cause the electronic controller means 20 to apply high pressure oil to an inlet 40 of the slave cylinder 26 by opening the pressure control valve 32 to allow flow of oil therethrough from the high pressure oil rail 14 of the engine 12.

Synchronization of gears of the transmission 16 is assured during shifting by processing input to the electronic controller means 20 from the input data, such synchronization being indicated to the operator by the shift prompters or indicators 34 on the display module 35, which not only apprise the operator that a synchronization point has been achieved but also indicate whether a downshift or upshift of the transmission 16 is required. The action-indicating prompts of the shift prompters 34 eliminate guesswork on the part of the operator and create a condition where transmission synchronizers are not required to successfully obtain the desired effect. Upon repositioning the gear shift 38 to the desired gear, the operator releases the push button 38. This action causes the pressure control valve 32 to close to the oil supply of the oil rail 14 and vent off the oil between the slave cylinder 26 and the pressure control valve 32 back to the engine oil sump 19 (not shown). Upon the venting of the high pressure oil, force from the clutch spring causes the shifting fork member 28 to move away from the engine 12 hence engaging the clutch mechanism 18.

Further, the system 10 incorporates a bypass switch 46, by means of which automatic control of the pressure control valve 32 for the slave cylinder 26 can be overridden so that a manual mode of operation of the clutch mechanism 18 operation is solely available for operator use, should such a preference exist. The manual mode of operation of the clutch mechanism 18 is always available. The clutch pedal 50 is mechanically engaged to the shifting fork member 28 in a conventional fashion in parallel to the slave cylinder 26 so that either can be used to disengage and engage the clutch mechanism 18. The bypass switch 46 is provided so that the slave cylinder 26 mode of clutch operation may be eliminated if desired.

As described above, the system 10 of the present invention provides a number of advantages, some of which have been described above and others of which are inherent in the invention. Also, modifications may be proposed to the system 10 without departing from the teachings herein. Accordingly, the scope of the invention is only to be limited as necessitated by the accompanying claims.

What is claimed is:

1. An electro-hydraulic clutch actuation system in combination with a vehicle, comprising:
   an engine engaged to the vehicle;
   said engine having a high pressure oil rail with an operating pressure at a pressure in a range in excess of 450 psig;
   a transmission engaged to said engine;
   a clutch engaged to said transmission; and
   said clutch operable through hydraulic pressure from said high pressure oil rail.

2. The clutch actuation system in the combination of claim 1 wherein said hydraulic pressure is regulated by an electronic controller means of said engine.

3. An electro-hydraulic clutch actuation system in combination with a manual transmission and a vehicle engine, the transmission being engaged to the engine, comprising:
   a slave cylinder engaged to a shifting fork member of a clutch;
   said slave cylinder having an inlet end;
   a high pressure fluid source;
   said inlet end of said slave cylinder being engaged to said high pressure fluid source via a high pressure fluid line;
   said fluid line incorporating a pressure control valve therein between said high pressure fluid source and said inlet end of said slave cylinder;
   said pressure control valve being functionally connected for regulation by an electronic controller means of the engine to allow fluid under pressure from said high pressure fluid source to actuate said slave cylinder and cause disengagement of said clutch at a predetermined synchronization point in response to operation of an actuation means;
   said high pressure fluid source is at a pressure in a range in excess of 450 psig; and
   said high pressure fluid source is a high pressure oil rail of the engine.

4. The clutch actuation system in the combination of claim 3 wherein said actuation means is a transmission manual shift lever mounted push button, said push-button being functionally connected to said electronic controller means.

5. The clutch actuation system in the combination of claim 4 wherein an override switch is provided to terminate regulation of said pressure control valve by said electronic controller means.

6. The clutch actuation system in the combination of claim 5 wherein said electronic controller means is functionally engaged to a speed sensor for sensing rotational speed of the transmission at a measuring point and said electronic controller means is functionally connected to a sensor for sensing speed of the engine.

7. The clutch actuation system in the combination of claim 6 wherein said rotational speed measuring point is a rotatable tailshaft of the transmission.

8. The clutch actuation system in the combination of claim 7 wherein said synchronization point is indicated by a first prompter on a display module operated by said electronic controller means in a predetermined manner in response to sensed tailshaft rotational speed and sensed engine speed.

9. The clutch actuation system in the combination of claim 8 wherein said electronic controller means further operatively engages a second prompter on said display module in a predetermined manner to indicate desired transmission shift direction in response to sensed tailshaft rotational speed and sensed engine speed.

10. The clutch actuation system in the combination of claim 3 wherein an override switch is provided to terminate regulation of said pressure control valve by said electronic controller means.

11. The clutch actuation system in the combination of claim 3 wherein said electronic controller means is functionally engaged to a speed sensor for sensing rotational speed of the transmission at a measuring point and said electronic controller means is functionally connected to a sensor for sensing speed of the engine.

12. The clutch actuation system in the combination of claim 11 wherein said rotational speed measuring point is a rotatable tailshaft of the transmission.

13. The clutch actuation system in the combination of claim 12 wherein said synchronization point is indicated by a first prompter on a display module operated by said electronic controller means in a predetermined manner in response to sensed tailshaft rotational speed and sensed engine speed.

14. The clutch actuation system in the combination of claim 13 wherein said electronic controller means further operatively engages a second prompter on said display module in a predetermined manner to prompt desired transmission shift direction in response to sensed tailshaft rotational speed and sensed engine speed.

* * * * *